United States Patent [19]
Schuplin

[11] 3,756,116
[45] Sept. 4, 1973

[54] PLASTIC NUT OR GROMMET

[75] Inventor: Jerome T. Schuplin, Parma Heights, Ohio

[73] Assignee: Fastway Fasteners, Inc., Lorain, Ohio

[22] Filed: Sept. 27, 1971

[21] Appl. No.: 183,891

[52] U.S. Cl. .................................... 85/80, 85/83
[51] Int. Cl. .................................... F16b 13/04
[58] Field of Search .................. 85/80, 82, 83, 84, 85/72; 151/41.75; 24/73 PF, 73 HS, 73 P, 73 PM

[56] References Cited
UNITED STATES PATENTS

| | | | |
|---|---|---|---|
| 2,836,214 | 5/1958 | Rapata | 85/80 |
| 2,836,215 | 5/1958 | Rapata | 85/80 |
| 3,105,407 | 10/1963 | Rapata | 85/72 |
| 3,203,304 | 8/1965 | Rapata | 85/84 |
| 3,313,083 | 4/1967 | Flora | 24/73 PF |
| 3,342,098 | 9/1967 | Schuplin | 85/83 |
| 3,358,551 | 12/1967 | Seckerson | 24/73 PF |
| 3,593,612 | 7/1971 | Schulze | 85/80 |

FOREIGN PATENTS OR APPLICATIONS

| | | | |
|---|---|---|---|
| 202,089 | 6/1956 | Australia | 85/82 |
| 888,450 | 1/1962 | Great Britain | 24/73 HS |

Primary Examiner—Marion Parsons, Jr.
Attorney—Isler and Ornstein

[57] ABSTRACT

A plastic nut or grommet is provided, of the type which is insertable in an opening in a supporting structure, for the purpose of securing various articles, such as a panel, to the wall structure, or for use as a drawer glide or shelf support. The nut or grommet is of a construction such that a relatively high torque is required on a screw used in conjunction with the nut to secure the nut in the opening, thereby assuring that the nut is firmly and rigidly secured in the opening. Retaining lugs are provided on the nut, which are disposed on relatively thin and flexible portions of the nut, whereby these lugs can flex inwardly, thereby facilitating entry of the shank of the nut in the opening of the support structure.

5 Claims, 13 Drawing Figures

Patented Sept. 4, 1973 3,756,116

INVENTOR.
JEROME T. SCHUPLIN
BY
Isler & Ornstein
ATTORNEYS

Patented Sept. 4, 1973

INVENTOR.
JEROME T. SCHUPLIN
BY
Isler & Ornstein
ATTORNEYS

PLASTIC NUT OR GROMMET

This invention relates generally to plastic fasteners of the nut or grommet type.

Plastic nuts, grommets or fasteners of the type to which this invention relates are disclosed in Rapata U.S. Pat. Nos. 2,788,047 and 2,836,214, and in my U.S. Pat. No. 3,342,098.

Fasteners such as disclosed in the aforesaid Rapata patents are characterized by the fact that the shank portions are separated by slots which extend from the axial bore of the shank to the sides of the shank, and the shank portions are provided with inclined surfaces which act to retain the shank in a panel or wall opening until the screw which is used in conjunction with the fastener to cause spreading of the shank portions is threaded into the axial bore. Since the shank portions are easily spread apart by the screw, very little torque on the screw is required to cause such spreading, with the result that the nut is not always held securely in the panel or wall opening into which the shank extends.

On the other hand, in fasteners such as disclosed in my aforesaid patent, the shank portions are interconnected by a relatively thin-walled tube or membrane, which, due to the fact that its sides are of angular conformation, offers little or no resistance to the spreading apart of the shank portions by the screw, so that there, again, very little torque on the screw is required to cause such spreading, with the result that the nut is not always held securely in the panel or wall opening into which the shank extends. Moreover, the tapered ribs in that patent, which are utilized to retain the shank in the panel or wall opening until the screw is inserted into the nut, are disposed on the relatively thick shank portions of the nut, which are not easily flexed toward each other, so that it is somewhat difficult to push these ribs into the panel or wall opening.

The present invention has, as its primary object, the provision of a plastic nut or rivet of the character described, in which the shank of the nut or rivet is of such a construction that a relatively high torque on the screw is required to cause spreading of the shank portions, thereby assuring that the nut will be firmly and rigidly secured in the panel or wall opening, and, at the same time, the retaining lugs or ribs which are utilized to retain the shank in the panel or wall opening until the screw is inserted into the nut, are disposed on portions of the shank which are relatively thin and flexible, so that these lugs or ribs can flex inwardly, thereby facilitating entry of the shank into the panel or wall opening.

Another object of the invention is to provide a plastic nut of the character described, in which the relatively thick portions of the shank which act to retain the nut in the panel or wall opening are devoid of the inclined surfaces and lugs or ribs, to which reference has been made, thereby simplifying the molding of the nut and the overall design of the nut.

Other objects and advantages of my invention will be apparent during the course of the following description.

In the accompanying drawings forming a part of this specification, and in which like numerals are employed to desig-nate like parts throughout the same, FIG. 1 is a top plan view of a preferred form of plastic nut, embodying the invention;

Figure 1:
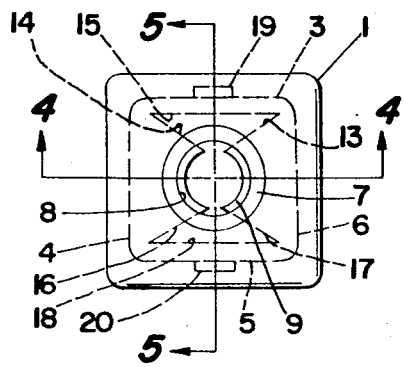
Figure 2:
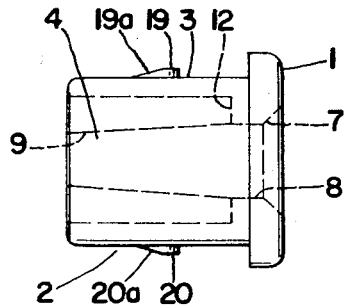
FIG. 2 is a side elvational view of the nut, as viewed from the left side of FIG. 1.
Figure 3:
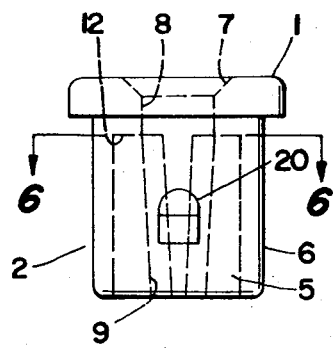
FIG. 3 is a side elevational view of the nut, as viewed from the bottom of FIG. 1.
Figure 4:
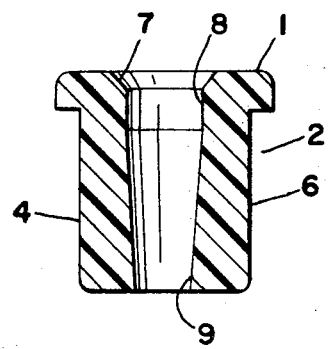
FIG. 4 is a cross-sectional view of the nut, taken on the line 4—4 of FIG. 1.
Figure 5:
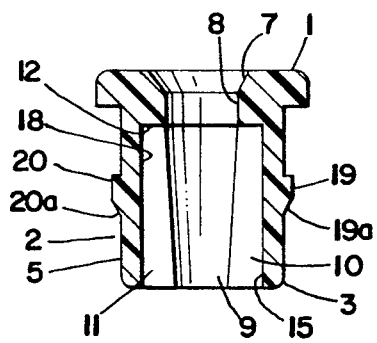
FIG. 5 is a cross-sectional view of the nut, taken on the line 5—5 of FIG. 1.
Figure 6:
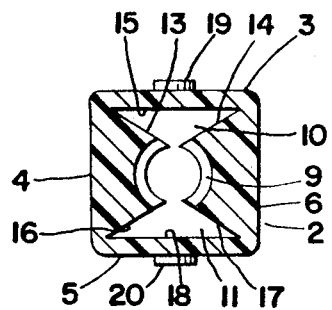
FIG. 6 is a cross-sectional view of the nut, taken on the line 6—6 of FIG. 3.

Referring more particularly to FIGS. 1 to 7 inclusive, the fastener is preferably of a unitary, one-piece construction made from a polymeric material, such as nylon or the like, which may be easily produced in quantity or mass production by conventional extrusion, molding or other similar forming methods, as well known in this art.

The device comprises a rectangular or square head 1, and a shank 2, of substantially square external cross-section, the sides of the shank being designated by reference numerals 3, 4, 5 and 6, it being noted that this external cross-section does not vary in dimensions from the head 1 to the end of the shank, except at the extreme end of the shank where the sides are curved inwardly slightly to facilitate entry of the shank into a hole in a support structure.

Extending axially through the fastener is a bore or passageway having a beveled entrant opening 7 in the head 1, a short portion 8 of uniform diameter, which extends partially into the shank, and a conical portion 9, which extends from the portion 8 to the end of the shank.

The shank is provided with cavities or hollow spaces, designated by reference numerals 10 and 11, which extend laterally from points at diametrically opposite sides of the portion 9 of the bore and longitudinally from a point 12, adjacent the lower end of the portion 8 of the bore, to the end of the shank.

The cavity 10 is of substantially triangular cross-section, defined by converging walls 13 and 14, and a wall 15, which is substantially parallel with the side 3 of the shank 2.

The cavity 11 is likewise of substantially triangular cross-section, defined by converging walls 16 and 17, and a wall 18 which is substantially parallel with the side 5 of the shank 2.

It may be noted, at this point, that the portions of the shank between the wall 15 and side 3, and between the wall 18 and side 5, are relatively thin, and are therefore easily flexed inwardly.

At the same time, the portions of the shank between the conical portion 9 of the bore and the sides 4 and 6 of the shank are solid and of substantial thickness, so that these portions are not inwardly flexible to any substantial degree, as compared with the other portions of the shank.

The sides 3 and 5 of the shank are provided with retaining lugs 19 and 20, having tapered portions 19a and 20a respectively, these lugs serving a purpose to be presently described.

Figure 7:
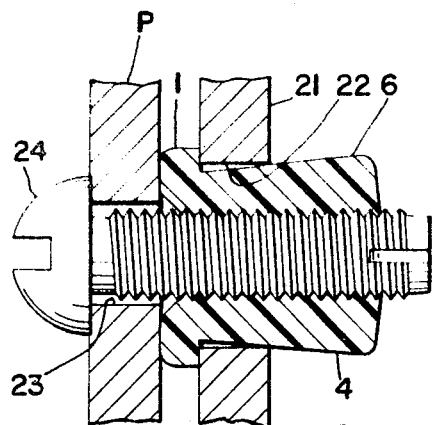
FIG. 7 is a fragmentary vertical cross-sectional view, showing the nut of FIGS. 1-6 assembled in a support structure, with a screw inserted through the nut for securing an article, such as a panel, to the support structure.

One manner or mode in which the fastener is used is best depicted in FIG. 7, wherein reference numeral 21 designates a support structure or wall having a square opening 22 which is slightly larger in dimensions than the external cross-section of the shank 2 of the fastener.

The shank of the fastener is inserted through the opening 22, this insertion being facilitated by the engagement of the tapered portion 19a and 20a of the lugs 19 and 20 with edges of the opening 22, and by reason of the fact that the portions of the shank on which the lugs are disposed are relatively thin and are thus easily flexed inwardly toward the bore of the fastener, as the lugs pass through the opening 22.

The function of the lugs 19 and 20 is to prevent the fastener from being retracted from the opening 22, pending permanent securement of the fastener in the opening.

This permanent securement is effected in the following manner.

After the fastener is in the position shown in FIG. 7, a panel P, which is to be secured to the wall or support structure 21, is placed adjacent the head 1 of the fastener, with the hole 23 of the panel in axial alignment with the bore of the fastener.

A screw 24, such as a Phillips head screw, is then inserted into the hole 23 and is then secured to the fastener in the manner shown in FIG. 7.

In the course of this securement, the threaded shank of the screw will cut threads in the wall of the portions 8 and 9 of the bore of the fastener, and due to the conical shape of the portion 9 of the bore, will cause the portions of the shank between the portion 9 of the bore and the sides 4 and 6 of the shank to spread apart, thereby forcing the sides 4 and 6 to firmly engage edges of the opening 22 in the wall or support structure 21.

Since the portions of the shank of the nut, between the portion 9 of the bore and the sides 4 and 6 of the shank are relatively thick, this, combined with the fact that the portions of the shank on which the retaining lugs are disposed offer substantial resistance to spreading apart of the thick portions, requires that a relatively high torque be applied in securing the screw 24 in position, with the result that the nut is rigidly and securely held in the opening 22.

Moreover, since the retaining lugs are not on the thick portions of the nut, as are the ribs in my aforesaid patent, these lugs do not present an additional factor opposing the entry of the shank of the nut into the opening 22, and the overall construction of the nut is greatly simplified.

The head of the nut or grommet may be round or polygonal, instead of square, and may vary in thickness in accordance with the required spacing between the panels 21 and P. In practice, this variation will usually be from one thirty-second inch to one-half inch.

Figure 8:
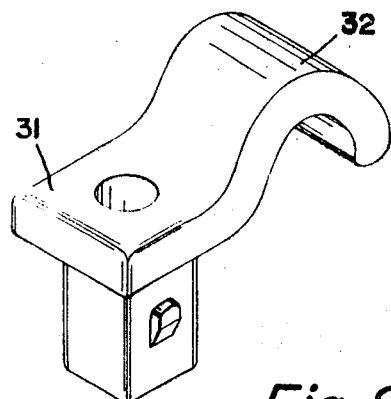
FIG. 8 is a perspective view of a modification of the plastic nut or fastener.

In FIG. 8, a modification of the nut is illustrated, in which the head 31 of the nut is provided with a curved portion 32 of hook-shaped conformation, whereby the nut may be utilized for securing electrical wires or cables, rods, etc., to the support structure in which the nut is mounted. The head 31 may, if desired, be provided with such curved portions at opposite sides of the head.

Figure 9:
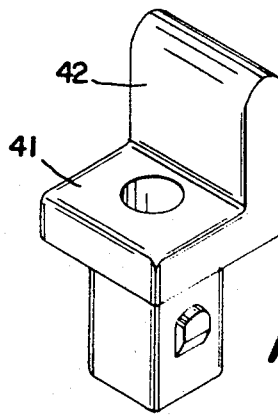
FIG. 9 is a perspective view of another modification of the nut.

In FIG. 9, a modification of the nut is shown, in which the head 41 of the nut is provided with a flange 42, whereby the nut may be secured to a support structure, and utilized as a drawer glide or shelf support.

Figure 10:
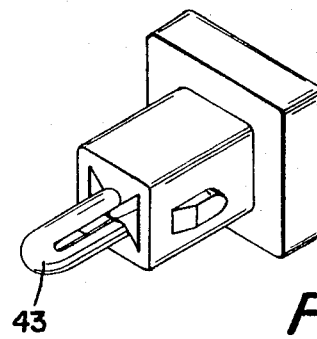
FIG. 10 is a perspective view of another modification of the nut.

In FIG. 10, a modification is shown, in which the shank of the nut is provided adjacent the lower end of the bore with a tube-like extension 43, which is adapted to receive the end of the screw 24, to which reference has previously been made, so that the nut may be used in electrical applications, and the tube-like extension serves to insulate the exposed end of the screw.

Figure 11:
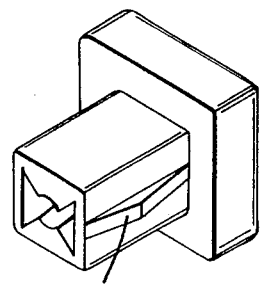
FIG. 11 is a perspective view of another modification of the nut.

In FIG. 11, a modification is shown, in which the shank of the nut is provided at opposite sides with retaining lugs or ribs 44 of somewhat different design than the lugs 19 and 20.

Figure 12:
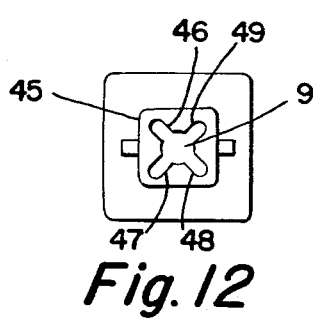
FIG. 12 is a bottom plan view of another modification of the nut.

In FIG. 12, a modification is shown, in which the shank 45 of the nut is provided with a conical bore, such as the bore 9 described in connection with FIGS. 1 to 7 inclusive, but instead of the cavities 10 and 11 of that form of the invention, cavities or slots 46, 47, 48 and 49, spaced circumferentially of the bore, are provided, which extend radially from the bore to points adjacent the corners of the shank.

Figure 13:
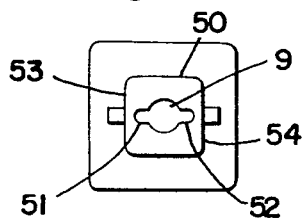
FIG. 13 is a bottom plan view of still another modification of the nut.

In FIG. 13, a modification is illustrated, in which the shank 50 of the nut is provided with a conical bore, such as the bore 9 described in connection with FIGS. 1 to 7 inclusive, but instead of the cavities 10 and 11 of that form of the invention, cavities or slots 51 and 52, of rectangular cross-section, extend from diametrically opposite sides of the bore to points closely adjacent the walls 53 and 54 of the shank.

It is to be understood that the forms of my invention, herewith shown and described, are to be taken as preferred examples of the same, and that various changes may be made in the shape, size and arrangement of parts thereof, without departing from the spirit of the invention or the scope of the subjoined claims.

Having thus described my invention, I claim:

1. In a combination plastic fastener including nut and grommet portions for fastening in an aperture in a panel structure, the combination comprising, a fastener body including a head portion, a shank portion and means defining a bore extending therethrough, said head including panel engaging shoulder means dimensioned to preclude passage of said fastener through said aperture, said shank extending from said head portion and defined by a substantially square cross section of a dimension smaller than said head and complementary to said aperture, said shank further including a first pair of oppositely disposed walls each including angularly inwardly directed converging portions terminating in an arcuate conical wall, each such wall defining a portion of said bore, said shank including a second pair of oppositely disposed walls interconnecting said first pair, said second pair dimensioned to provide a relatively thin, imperforate, flexible web extending between the angular extremity of said walls of said first pair to define therewith a substantially triangular cavity extending from a point adjacent said head to the free end of said shank, said bore defined by an entrant opening in said head, a barrel portion of uniform diameter extending through said head and an interrupted conical portion defined by said arcuate conical wall of said first pair, and lug means carried by the outer surface of said second pair of shank walls engageable with the sides of said aperture in said panel to preclude unintended retraction of said shank through said aperture.

2. A nut or grommet, as defined in claim 1, wherein said head is provided at at least one side with a curved extension or hook-like conformation.

3. A nut or grommet, as defined in claim 1, wherein said head is provided at one side with a flange substantially perpendicular to said head.

4. A nut or grommet, as defined in claim 1, wherein said shank is provided at its outer end, adjacent said bore, with a tube-like extension formed integrally with said shank.

5. A nut or grommet, as defined in claim 1, wherein said retaining lugs have oppositely sloping faces.

* * * * *